United States Patent
Agarwal et al.

(10) Patent No.: US 12,541,730 B1
(45) Date of Patent: Feb. 3, 2026

(54) ADAPTIVE THROTTLING OF CALLS TO SERVICE ENDPOINTS FROM WORKFLOWS BY MODIFYING WORKFLOW DEFINITIONS

(71) Applicant: Amazon Technologies, Inc., Seattle, WA (US)

(72) Inventors: Deepak Agarwal, Seattle, WA (US); Rodrigo Diaz Martin, SeaTac, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 17/935,553

(22) Filed: Sep. 26, 2022

(51) Int. Cl.
   G06Q 10/06 (2023.01)
   G06Q 10/0631 (2023.01)
   G06Q 10/0639 (2023.01)

(52) U.S. Cl.
   CPC ... G06Q 10/06316 (2013.01); G06Q 10/0639 (2013.01)

(58) Field of Classification Search
   None
   See application file for complete search history.

(56) References Cited

U.S. PATENT DOCUMENTS

| | | | |
|---|---|---|---|
| 6,961,341 B1 | 11/2005 | Krishnan | |
| 8,527,647 B2 | 9/2013 | Gopalakrishnan | |
| 8,782,184 B2 | 7/2014 | Furlong et al. | |
| 8,799,451 B2 | 8/2014 | Raleigh | |
| 10,171,681 B2 | 1/2019 | Raleigh et al. | |
| 10,225,164 B2 | 3/2019 | Revanuru | |
| 10,659,371 B1* | 5/2020 | Jain | H04L 67/51 |
| 10,776,212 B2 | 9/2020 | Maccanti et al. | |
| 10,944,683 B1* | 3/2021 | Roskind | H04L 47/58 |
| 11,032,392 B1* | 6/2021 | Gabrielson | G06F 9/45558 |
| 2011/0225565 A1* | 9/2011 | van Velzen | G06F 9/5038 705/348 |
| 2019/0082006 A1* | 3/2019 | Moniz | H04L 67/1027 |
| 2020/0052881 A1* | 2/2020 | Hwang | G06F 21/64 |
| 2021/0044633 A1* | 2/2021 | John | H04L 65/1073 |
| 2022/0308934 A1* | 9/2022 | Tomoda | G06N 20/00 |
| 2024/0257007 A1* | 8/2024 | Subramanian | G06Q 10/0633 |

* cited by examiner

*Primary Examiner* — Alan Torrico-Lopez
(74) *Attorney, Agent, or Firm* — Robert C. Kowert; Kowert, Hood, Munyon, Rankin & Goetzel, P.C.

(57) ABSTRACT

Systems and methods for a workflow manager to adaptively throttle service calls to service endpoints are disclosed herein, according to some embodiments. A system includes a plurality of service endpoints. The system also includes a workflow definition repository storing workflow definitions, where a workflow definition defines both tasks for a workflow to perform that corresponds to service calls to the service endpoints, and a dependency ordering between the tasks. The system also includes workflow execution nodes implementing workflow engine instances. A workflow engine instance executes a workflow according to a workflow definition. Responsive to health information indicating that a service endpoint is operating below a performance threshold, the workflow manager modifies workflow definitions using that service to incorporate a staging area. Instead of transitioning to a task that corresponds to a service call to the service endpoint, the workflow engine instances executing modified workflow definitions, transition to the staging area.

20 Claims, 9 Drawing Sheets

ADAPTIVE THROTTLING OF CALLS TO SERVICE ENDPOINTS FROM WORKFLOWS BY MODIFYING WORKFLOW DEFINITIONS

BACKGROUND

A workflow can consist of the steps and/or states in a process to accomplish an overall job or task. Workflows can appear as a series of steps in a checklist, or as a diagram that visualizes those steps. Workflows provide a set of repeatable steps and tasks that can be initiated, scheduled, and/or monitored. With workflows, businesses can achieve improved levels of reliability for distributed applications without adding additional complexity to their code. Workflows promote logical separation between the control flow of a job's stepwise logic, and the actual units of work that contain unique business logic. With this division, the state machinery of an application can be managed, maintained, and scaled separately from any core business logic.

A workflow engine can manage and monitor the state of activities in a workflow, and determines which new activity to transition to according to defined workflows. A workflow engine facilitates the flow of information, tasks, and events. Workflow engines can have three functions. First, a workflow engine can verify the current process status—to check whether it is validly executing a task, given current status. Second, a workflow engine can determine the authority of users—it can check if the current user is permitted to execute the task. Third, a workflow engine can execute a conditional script. After passing the previous two steps, the workflow engine can execute the task. If the execution successfully completes, it can return the success, but if not, it can report the error to trigger and sometimes roll back the change.

A workflow management system ("WfMS" or "WFMS") provides an infrastructure for the set-up, performance, and monitoring of a defined sequence of tasks, arranged as a workflow application. A workflow application is a software application which automates, to at least some degree, a process or processes. The processes can be any process that requires a series of steps to be automated via software. Functions that can be automated are handled by the application. WFMS can be used in distributed IT environments such as grid computing or cloud computing with a provider network. The aim of such systems can be to manage the execution of various processes that may belong to the same application.

Figure 1:
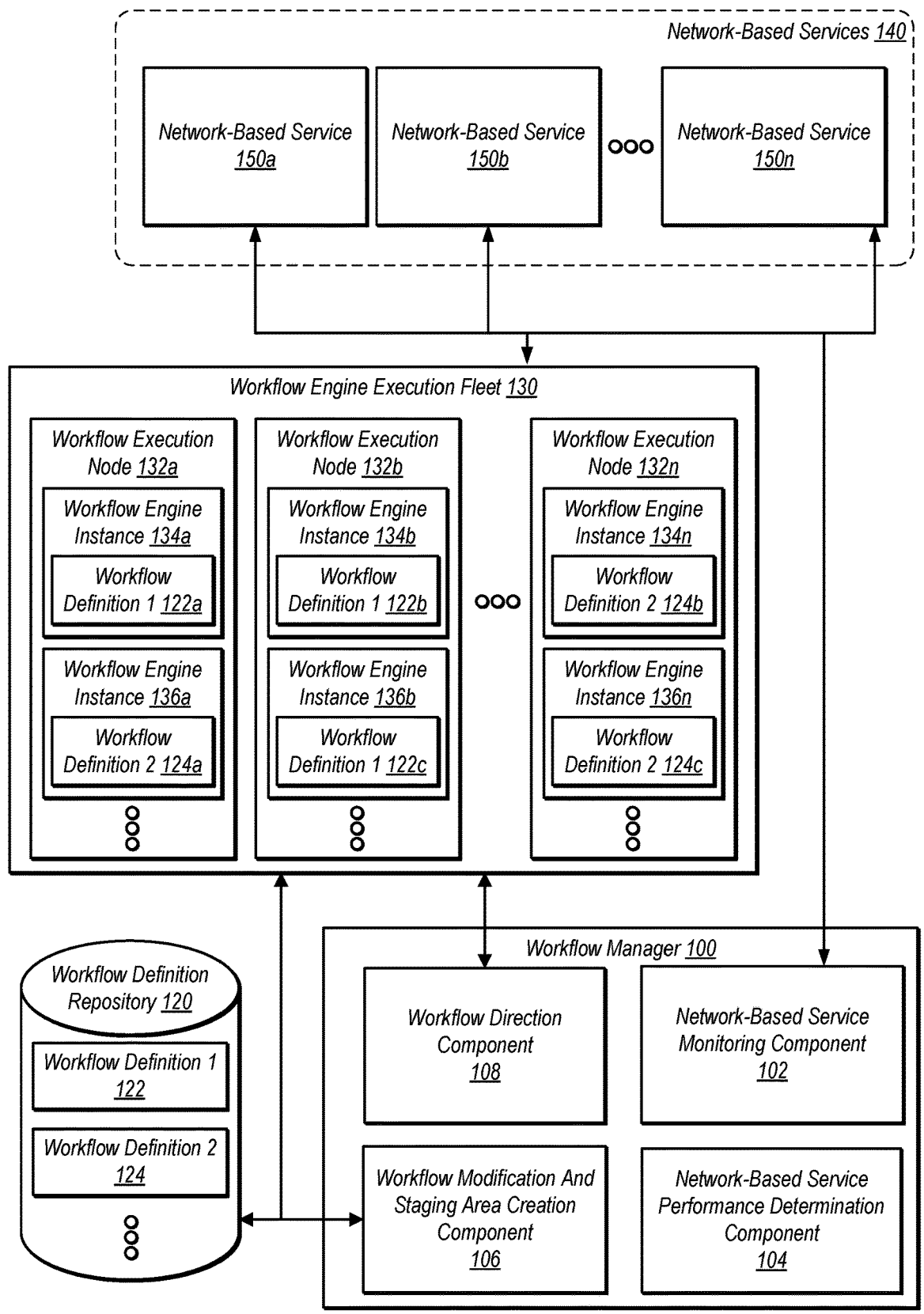
FIG. 1 illustrates a logical block diagram for adaptively throttling service calls to service endpoints from workflows by modifying workflow definitions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Systems and methods for a workflow manager to adaptively throttle service calls to service endpoints by modifying workflow definitions are disclosed herein, according to some embodiments. The workflow manager can, in some embodiments, move the high traffic customers orders to a staging state, so that the service does not get overwhelmed and crash. The staging state can be a node or stage in a graph before the node that is having outages, or that is too slow to keep up with the velocity of order traffic. Instead of being manually executed by an operator, some embodiments of the disclosed workflow manager provide an automated way to determine the outage and capacity of a service (which can be a node endpoint in the workflow). These embodiments can adaptively engage and tune the workflow traffic to the service until the service has recovered, without engaging an operator. The workflow manager can be its own service managing workflows external to the workflow manager service, or the workflow manager might be part of an overall workflow service where it manages workflow execution nodes and/or workflow engine instances as part of a workflow engine execution fleet, depending on the embodiment. There are other configurations of how a workflow manger manages workflows, and the embodiments described here should not be construed as limiting.

Many companies use internally developed workflows services to perform workflows, such as processing customer orders. In some embodiments, the workflows are written as a graph that a workflow engine can read and determine the next step (e.g., the next step to process the orders). The steps or nodes in the graphs can be the service endpoints that workflow engine calls in the workflow (e.g., to process an order). The services behind the service endpoint can processes a part of the order, and then can returns a result back to the workflow engine, in some embodiments. The workflow engine can evaluate the result from the service, can consult the workflow (e.g., graph), and can pick the next node (e.g., in the graph) that can represent a service that will process the next stage of the order. The services or endpoints can be external to the entity executing the workflow, or internal to the entity. In either case the services or endpoints can have outages or issues.

Previously, a workflow engine had no way to know the status of the services it was using (where the services could be a node endpoint in the workflow). Therefore, a workflow engine could potentially overload a service having intermittent operational issues. In addition, the workflow engine also did not know how fast or slow a service (which could be a node endpoint in the workflow) could process tasks, and therefore could not adaptively tune traffic to the service. In addition, as a service was recovering from an outage, a storm of customer orders traffic from one or many workflow engines could bring down the service again, in a death spiral effect. This might cause the outages to continue. In addition, a service might host multiple node endpoints, where each node endpoint could therefore be impacted even if only one node is impacted, in a cross-operation disruption.

Some embodiments of the workflow manager to adaptively throttle service calls to service endpoints by modifying workflow definitions solve these and other problems by moving the high traffic customers orders to a staging state, so that the service does not get overwhelmed and crash. The staging state can be a node or stage in a graph before the node that is having outages, or that is too slow to keep up with the velocity of order traffic. Some embodiments can also provide recovery time to allow a service to be fully functional before the service can receive a steady stream of customer orders again. Some embodiments can also allow a service to scale-up by adding more hosts, when the service receives more traffic (e.g., customer order traffic) than the current service hosts can handle. Some embodiments can resume the customer traffic from the point of failure without rejecting the customer orders.

Instead of being manually executed by an operator, some embodiments of the disclosed workflow manager provide an automated way to determine the outage and capacity of a service (which can be a node endpoint in the workflow). These embodiments can adaptively engage and tune the workflow traffic to the service until the service has recovered, without engaging an operator. Some embodiments can listen to multiple signals from the services (i.e., node endpoints in the workflow) that are part of the workflow graph. Some of these embodiments can adaptively control the workflow traffic. Some embodiments can provide signals to the service to scale-up. Some embodiments can slowly ramp up sending traffic (e.g., customer orders) to a service until a breaking point is found in the service. When a breaking point is found, some embodiments can then determine order processing velocity of the service. The determination of the breaking point might be a constant feedback loop, in some embodiments, and might operate a near real-time, in some of these embodiments. This can help to increase or decrease the workflow (e.g., customer order) traffic to the services in the workflow, according to these embodiments. Some embodiments can also improve the default retry policy, which has caused Tier-1 services outages in the past.

Example System Environment

FIG. 1 illustrates a logical block diagram for adaptively throttling service calls to service endpoints from workflows by modifying workflow definitions, according to some embodiments. FIG. 1 illustrates a plurality of network-based services (140) that includes individual network-based services (150a, 150b, . . . 150n). The network-based services (140) can be completely disparate services provided by different entities, or one or more of the plurality of services might be provided by the same entity. The individual network-based services can include one or more processors and associated memory. FIG. 1 also illustrates a workflow definition repository (120). The workflow definition repository can be implemented by a storage device of some kind, in some embodiments. The workflow definition repository (120) can store one or more workflow definitions (122, 124, . . . ). A workflow definition (122, 124, . . . ) can define a plurality of tasks for a workflow to perform that correspond to service calls to different ones (150a, 150b, . . . 150n) of the fleet of network-based services (140), according to some embodiments. A workflow definition (122, 124, . . . ) can also define a dependency ordering between the tasks.

FIG. 1 also illustrates a workflow engine execution fleet (130) that can include workflow execution nodes (132a, 132b, . . . 132n), according to some embodiments. Each workflow execution node can include one or more processors and associated memory, in these embodiments. The workflow execution nodes (132a, 132b, . . . 132n) can implement one or more of a plurality of workflow engine instances, according to some embodiments. For example, workflow execution node 132a implements workflow engine instances (134a, 136a, . . . ). As another example, workflow execution node 132b implements workflow engine instances (134b, 136b, . . . ). As another example, workflow execution node 132n implements workflow engine instances (134n, 136n, . . . ). An individual workflow engine instance can execute a workflow according to one of the workflow definitions (122, 124 . . . ). For example, workflow engine instance (134a) of workflow execution node (132a) executes a workflow according to workflow definition 1 (122a), and workflow engine instance (136a) of workflow execution node (132a) executes a workflow according to workflow definition 2 (124a). As another example, both workflow engine instances (134b, 136b) of workflow execution node (132b) execute a workflow according to workflow definition 1 (122b, 122c). As another example, both workflow engine instances (134n, 136n) of workflow execution node (132n) execute a workflow according to workflow definition 2 (124b, 124c).

Finally, FIG. 1 also illustrates a workflow manager (100). The workflow manager 100 can be implemented by one or more different computing devices, comprising one or more other processors and associated memory, in some embodiments. A network-based service monitoring component 102 of the workflow manager 100 can obtain performance or health information regarding one or more of the network-based services in the fleet of network-based services (140). More specifically, this network-based service monitoring component 102 can obtain this performance or health information by, for example: (a) receiving the performance or health information from one or more network-based services that are self-reporting the performance or health information; (b) querying one or more network-based services regarding the performance or health information; (c) obtaining the performance or health information from an external health-related service that determines the performance or health information regarding the one or more network-based services; (d) obtaining latency information regarding the one or more network-based services from one or more of the plurality of workflow execution nodes and/or workflow engine instances; and/or (e) obtaining other information regarding the network-based services, such as faults, failures, and/or errors regarding the network-based services, received from, for example, one or more of the plurality of workflow execution nodes and/or workflow engine instances, or a load balancer balancing the load of one or more network-based services, or from the one or more network-based services themselves. For example, the workflow manager might obtain error or failure information regarding the one or more network-based services from at least some of the plurality of workflow engine instances, in some embodiments. The network-based service monitoring component 102 can use one, some, all, or none of these four techniques described above in obtaining this performance or health information for network-based services. The network-based service monitoring component 102 might use other techniques for obtaining this information not described here, and these examples should not be construed as limiting.

The network-based service performance determination component (104) of the workflow manager (100) can determine whether or not the performance or health information of any particular network-based service (150a, 150b, . . . 150n) indicates that the network-based service is operating below a performance threshold, in some embodiments. The network-based service performance determination component (104) can perform this check for all the network-based services, or only for particular ones of the network-based services. The performance threshold might be a particular number of a particular measurement, such as service calls responded to per second, or it might be an amalgamation of a number of different data values that can describes the overall health or service of the particular network-based service. The performance threshold might be the same for all the network-based services, or might be different for individual network-based services.

If the performance or health information of any particular network-based service (150a, 150b, . . . 150n) indicates that the network-based service is operating below a performance threshold, then the workflow manager and staging area creation component (106) of the workflow manager (100) can modify at least one of the workflow definitions (122, 124, . . . ) to incorporate a staging area in the modified workflow definition, according to some embodiments. A staging area can be created at a location that, according to the dependency ordering, is prior to a task involving sending a service call to the network-based service indicated as operating below the performance threshold, in some embodiments.

For example, if network-based service 150a was indicated by the network-based service performance determination component (104) as operating below some type of performance threshold, and workflow definition 1 (122) included a task that involved sending a service call to service 150a, then a staging area could be created in workflow definition 1 (122) prior to that task. If workflow definition 2 (124) also included a task that involved sending a service call to service 150a, then a staging area could also, but would not have to be, created in workflow definition 2 (124) prior to that task. The workflow manager and staging area creation component (106) of the workflow manager (100) might modify one, all, some, or none of the workflow definitions that include a task that involved sending a service call to the service indicated as operating below the performance threshold, depending on the embodiment.

Any modified workflow definition (122, 124, . . . ) would then indicate, for the workflow engine instances running workflows using that definition, to transition the workflow to the newly created staging area, instead of the task involving sending the service call to the at least one network-based service indicated as operating below the performance threshold. Continuing with the previous example, if workflow definition 1 (122) was modified, then workflow definition 1 would indicate to a transition to a staging area, instead of transitioning to a task in the workflow that involved sending a service call to service 150a.

In order to modify at least one of the workflow definitions (122, 124, . . . ) to incorporate a staging area in the modified workflow definition, the workflow manager and staging area creation component (106) of the workflow manager (100) might communicate with the workflow definition repository (120), or the workflow execution nodes (132a, 132b, . . . 132n) of the workflow engine execution fleet (130), or might communicate with both, depending on the embodiment. For example, the workflow manager and staging area creation component (106) might modify a workflow definition (122, 124, . . . ) in the workflow definition repository (120) that stores workflow definitions. In some of these embodiments, any new workflow engine instances of the plurality of workflow engine instances (134a . . . n, 136a . . . n) would obtain the modified workflow definition from the definition repository, and would execute a workflow using the modified workflow definition. For example, the workflow manager and staging area creation component (106) might communicate the modified workflow definition to one or more of the workflow execution nodes (132a, 132b, . . . 132n), where the one or more workflow execution nodes (132a, 132b, . . . 132n) would correspondingly update some or all of its workflow engine instances (134a . . . n, 136a . . . n) to use the new workflow definition. In some of these embodiments, the workflow engine instances executing workflows using the old workflow definition would update their workflow to use the new workflow definition. For example, if workflow definition 1 (122a, 122b, 122c) was modified, then workflow engine instances 134a, 134b, and 136b would update the workflow definitions that their workflows were running.

The workflow direction component (108) of the workflow manager (100) can direct at least one of the workflow engine instances (134a . . . n, 136a . . . n) to transition its workflow from the staging area to the task involving the service call to the network-based service indicated as operating below the performance threshold, according to some embodiments. The workflow direction component (108) might direct such a workflow engine instance responsive to performance or health information indicating that the network-based service has a capacity to process additional service calls, in some of these embodiments. For example, the network-based service monitoring component (102) can continue to monitor the network-based services, including the service indicated as operating below the performance threshold. The network-based service performance determination component (104) might determine that the network-based service indicated as operating below the performance threshold (which is service 150a in the examples above) now has a capacity to process additional service calls, in some embodiments. Based on this determination, the workflow direction component (108) of the workflow manager (100) can direct at least one of the workflow engine instances (134a . . . n, 136a . . . n) to transition its workflow from the staging area to the task involving the service call to network-based service 150a (which is the service indicated as operating below the performance threshold).

In addition to the functionality described above, the workflow manager (100) can also monitor the performance of the workflow execution nodes (132a . . . 132n) in the workflow engine execution fleet (130). The workflow manager (100) might obtain performance and/or health information regarding the workflow execution nodes (132a . . . 132n) in the workflow engine execution fleet (130). If the performance and/or health information indicates that one or more of the workflow execution nodes (132a . . . 132n) in the workflow engine execution fleet (130) are exhibiting lower performance, then the workflow manager (100) might scale-up the workflow engine execution fleet (130). The workflow manager (100) might provide an indication to the workflow engine execution fleet (130) to provision additional workflow execution nodes (132a . . . 132n) to handle the increased load, or the workflow manager (100) itself might provision the additional workflow execution nodes itself and add the newly provisioned nodes to the workflow engine execution fleet (130), in order to handle additional workflow engine instances (134, 136).

The various components of the workflow manager (100) are for illustrative purposes only, and any particular workflow manager might not divide up its functionality into these particular components. In particular, some, all, or none of the network-based service monitoring component (102), the network-based service performance determination component (104), the workflow modification and staging area creation component (106), and the workflow direction component (108) might be included in any given workflow manager (100), depending on the embodiment. A workflow manager might include the functionality described by the component, without including the particular component, as a stand-alone component, depending on the embodiment. In addition, the workflow manager can be its own service managing workflows external to the workflow manager service, or the workflow manager might be part of an overall workflow service where it manages workflow execution nodes and/or workflow engine instances as part of a workflow engine execution fleet, depending on the embodiment. There are other configurations of how a workflow manger manages workflows, and the embodiments described here should not be construed as limiting. The illustration of the workflow manger 100 in FIG. 1 should therefore not be construed as limiting.

Figure 2:
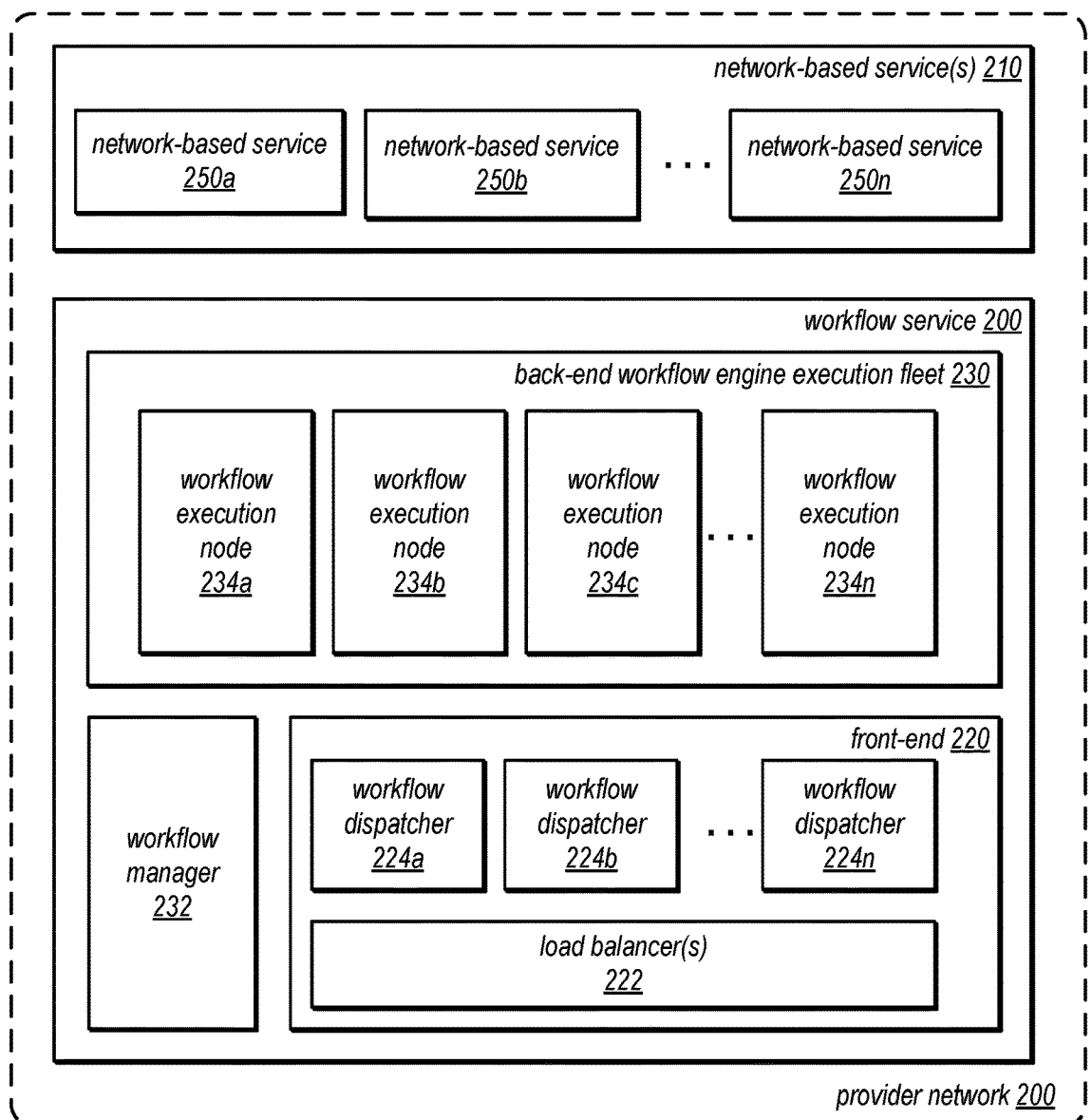
FIG. 2 is a block diagram illustrating a provider network that includes a workflow service that implements adaptively throttling service calls to service endpoints from workflows by modifying workflow definitions, according to some embodiments.

FIG. 2 is a block diagram illustrating a provider network that includes a workflow service that implements adaptive throttling of service calls to service endpoints from workflows by modifying workflow definitions, according to some embodiments. Provider network 200 may be set up by an entity such as a company or a public sector organization to provide one or more services (such as various types of cloud-based computing or storage) accessible via the Internet and/or other networks to clients 240. Provider network 200 may include numerous data centers hosting various resource pools, such as collections of physical and/or virtualized computer servers, storage devices, networking equipment and the like (e.g., computing system 900 described below with regard to FIG. 9), needed to implement and distribute the infrastructure and services offered by the provider network 200. In some embodiments, provider network 200 may provide computing resources, such as those discussed below. Clients 240 may submit various requests to access these various services offered by provider network 200 via network 260. Likewise, network-based services or other resources, systems, or devices within provider network may themselves communicate and/or make use of one another as a client application that submits requests to provide different services.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing servers, hosts, systems or nodes (or simply, nodes), in some embodiments, each of which may be similar to the computer system embodiment illustrated in FIG. 9 and described below. In one embodiment, the functionality of a given system or service component (e.g., a component of a front-end 220 or back-end workflow engine execution fleet 230) may be implemented by a particular node or may be distributed across several nodes. In some embodiments, a given node may implement the functionality of more than one service system.

Provider network 200 may implement many different kinds of network-based services, and thus the following discussion of various services is not intended to be limiting. For example, various network-based services may be implemented such as deployment service(s), management service(s), application service(s), and analytic service(s) 210. In some embodiments, provider network 200 may implement storage service(s). Storage service(s) may be one or more different types of services that provide different types of storage. For example, storage service(s) may be an object or key-value data store that provides highly durable storage for large amounts of data organized as data objects. In some embodiments, storage service(s) may include an archive long-term storage solution that is highly-durable, yet not easily accessible, in order to provide low-cost storage. In some embodiments, storage service(s) may provide virtual block storage for other computing devices, such as compute instances implemented as part of a virtual computing service. In some embodiments, provider network 200 may implement database service(s), which may include many different types of databases and/or database schemes, such as relational and non-relational databases.

Provider network 200 may implement networking service(s) in some embodiments, which may configure or provide virtual networks, such as virtual private networks (VPNs), among resources implemented in provider network 200 as well as control access with external systems or devices. In some embodiments, provider network 200 may implement virtual computing service(s), to provide computing resources. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments, clients 240 or other any other user may be configured (and/or authorized) to direct network traffic to a compute instance.

In various embodiments, provider network 200 may implement internal services to provide components to coordinate the metering and accounting of client usage of network-based services, such as by tracking the identities of requesting clients, the number and/or frequency of client requests, the size of data stored or retrieved on behalf of clients, overall storage bandwidth used by clients, class of storage requested by clients, or any other measurable client usage parameter. Provider network 200 may also implement financial accounting and billing service(s), or may maintain a database of usage data that may be queried and processed by external systems for reporting and billing of client usage activity. In certain embodiments, provider network 200 may implement components (e.g., metering service(s)) that may be configured to collect, monitor and/or aggregate a variety of service operational metrics, such as metrics reflecting the rates and types of requests received from clients, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components (e.g., as part of a monitoring service), while in other embodiments such metrics (or relevant portions of such metrics) may be exposed to clients to enable such clients to monitor their usage of network-based services. In some embodiments, provider network 200 may implement components to implement user authentication and access control procedures, such as access management service(s), for provider network 200 resources.

Network-based service(s) 210 implemented as part of provider network 200 may each implement respective interfaces, such as a graphical user interface (GUI), command line interface, and/or programmatic interfaces, such as an Application Programming Interface (API), in some embodiments. For example, requests directed to a virtual computing service may be formatted according to an API for the virtual computing service, while requests to a storage service(s) may be formatted according to an API for storage service(s). Different portions of the various APIs may be exposed to external clients, in some embodiments, with some other portions remaining available to internal clients, such as other network-based services in provider network 200.

Various embodiments of workflow service 200 of the provider network 200 may implement a front-end 220 to handle requests (e.g., customer orders), such as the request formatted according to the interfaces discussed above. Front-end 220 may include one or more load-balancer(s) 222 which may push requests to different ones of a pool of workflow dispatchers, such as workflow dispatchers 224*a*, 224*b*, 224*c*, and 224*n*. Workflow dispatchers may perform initial processing of a request which involves executing a workflow, such as parsing the request to identify the type of request and resources to be involved in its processing, as well as performing initial validity and/or filtering checks, in some embodiments. Not all workflows are initiated with such a front-end (220) handling requests from clients. Workflows might be initiated by other kinds of entry points. There might another network-based service that creates an initiation of a workflow to handle the tasks of that network-based service, for example, in some embodiments. There are many other kinds of entry points for the initiation of workflows in a workflow service. Therefore, the description of the front-end (220) in relation to the workflow service (200) should not be construed as limiting.

Back-end workflow engine execution fleet 230 of the workflow service 210 may provide a pool of one or more resources (e.g., hosts, servers, nodes, etc.) which may process requests, such as workflow execution nodes 234*a*, 234*b*, 234*c*, and 234*n*. Workflow execution nodes 234 may include application or other software programs and/or hardware components for performing workflow execution. For example, workflow execution nodes 234 may implement one or more of a plurality of workflow engine instances, according to some embodiments. An individual workflow engine instance can execute a workflow according to one of the workflow definitions.

The workflow service 200 may also implement a workflow manager 232, which may manage the operation of workflow service 200 resources, such as workflow execution nodes 234 and workflow dispatchers, among others. For example, workflow manager 232 may handle failure scenarios for workflow execution nodes in order to ensure that sufficient numbers of workflow dispatchers 224 and workflow execution nodes 234 are available. Other features, such as, implementing adaptive throttling of service calls to service endpoints from workflows by modifying workflow definitions may be implemented as part of the workflow manager 232, in some embodiments. The workflow manager 232 may include some or all of the same: network-based service monitoring component (102), network-based service performance determination component (104), workflow modification and staging area creation component (106), and/or workflow direction component (108) described in regards to FIG. 1. The workflow manager 232 might include some or all of the functionality of these various components described in FIG. 1 without including a specific component to implement that functionality, depending on the embodiment. The workflow manager can be its own service managing workflows external to the workflow manager service, in some embodiments. In other embodiments, the workflow manager might be part of an overall workflow service where it manages workflow execution nodes and/or workflow engine instances as part of a workflow engine execution fleet, where one embodiment is disclosed in FIG. 2. There are other configurations of how a workflow manger manages workflows, and the embodiments described here with regard to FIG. 2 should not be construed as limiting.

Clients 240 may encompass any type of client configurable to submit requests to network provider 200. For example, a given client 240 may include a suitable version of a web browser, or may include a plug-in module or other type of code module configured to execute as an extension to or within an execution environment provided by a web browser. Alternatively, a client 240 may encompass an application such as a database application (or user interface thereof), a media application, an office application or any other application that may make use of compute instances, a data volume, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 240 may be configured to generate network-based services requests according to a Representational State Transfer (REST)-style network-based services architecture, a document- or message-based network-based services architecture, or another suitable network-based services architecture. In some embodiments, a client 240 (e.g., a computational client) may be configured to provide access to a compute instance or data volume in a manner that is transparent to applications implement on the client 240 utilizing computational resources provided by the compute instance or block storage provided by the data volume.

Clients 240 may convey network-based services requests to provider network 200 via external network 260. In various embodiments, external network 260 may encompass any suitable combination of networking hardware and protocols necessary to establish network-based communications between clients 240 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 240 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 240 and the Internet as well as between the Internet and provider network 200. It is noted that in some embodiments, clients 240 may communicate with provider network 200 using a private network or even a controller area network (CAN) of a single machine rather than the public Internet.

Examples of Modified Graph-Based Workflow Definitions

Figure 3:
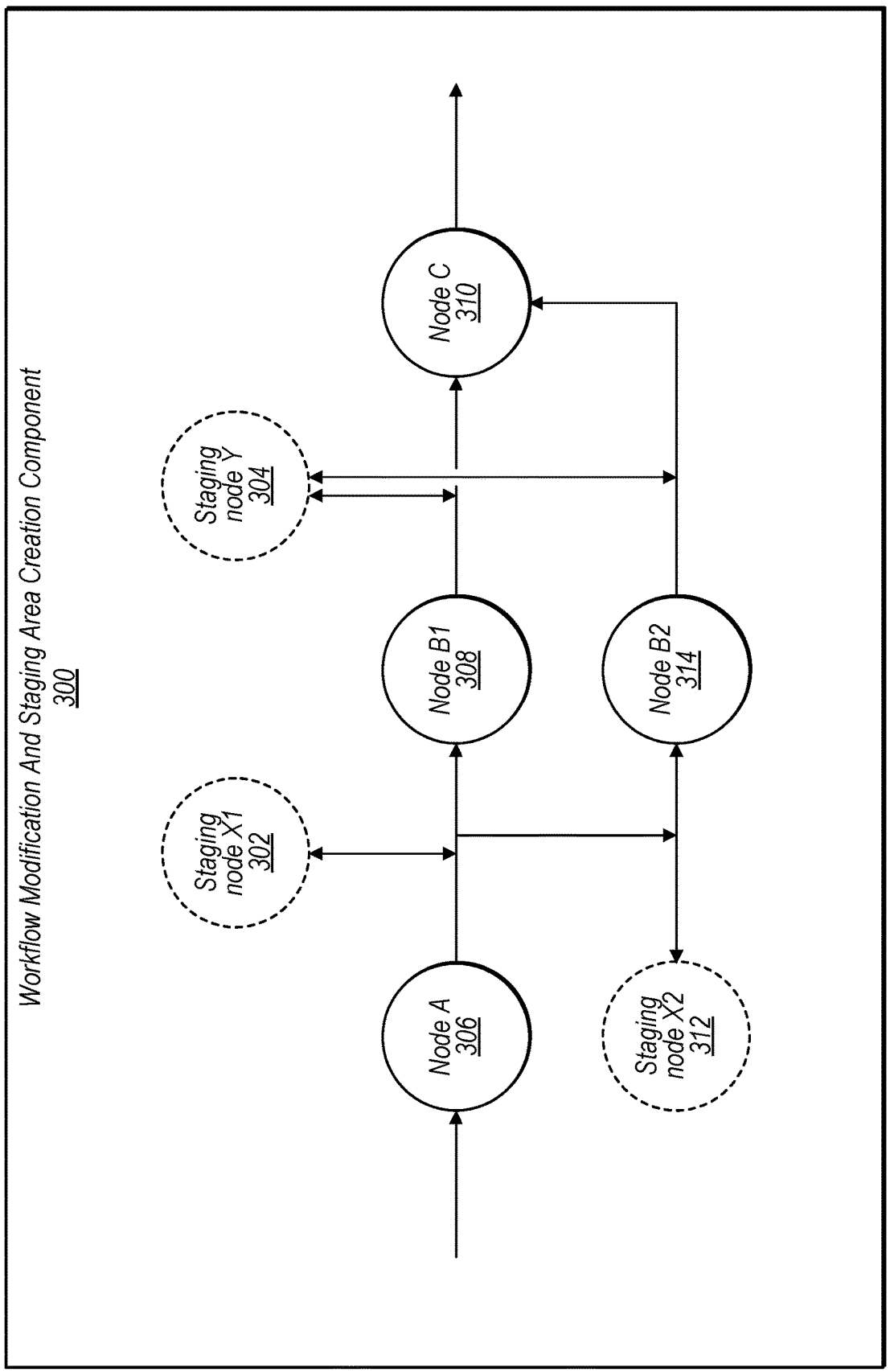
FIG. 3 is a block diagram of a generic workflow graph that illustrates adaptively throttling service calls to service endpoints from workflows by modifying workflow definitions to include staging areas, according to some embodiments.

FIG. 3 is a block diagram of a generic workflow graph that illustrates adaptively throttling service calls to service endpoints from workflows by modifying workflow definitions to include staging areas, according to some embodiments. In some embodiments, the one or more workflow definitions are defined according to a graph-based structure, where the plurality of tasks are represented as nodes in the graph-based structure, and the dependency ordering between the tasks is specified by edges between the nodes on the graph-based structure. An example of such a graph-based structure is shown in FIG. 3. An unmodified version of this graph-based structure might be stored as a workflow definition (122, 124, ...) in the workflow definition repository (120) of FIG. 1. Workflow engine instances (134a ... n, 136a ... n) might be executing workflows according to the workflow definition of this graph-based structure, according to some embodiments.

FIG. 3 discloses a situation where network-based services that correspond to Nodes B1 (308), B2 (314), and C (310) might be indicated as operating below the performance threshold. Thus, the workflow modification and staging area creation component (300) of the workflow manager (100) can modify the graph to incorporate a staging area in the modified graph at locations that, according to the dependency ordering, is prior to the tasks (B1 (308), B2 (314), and C (310)) involving sending a service call to network-based services indicated as operating below the performance threshold. Thus, staging node X1 (302) is inserted before node B1 (308), staging node X2 (312) is inserted before node B2 (314), and staging node Y (304) is inserted before node C (310). The modified graph, therefore, indicates, for the workflow engine instances executing a workflow according to this graph, to transition the workflow to the appropriate staging area (302, 312, 304), instead of the tasks (308, 314, 310) involving sending the service calls to the network-based services indicated as operating below the performance threshold.

Figure 4:
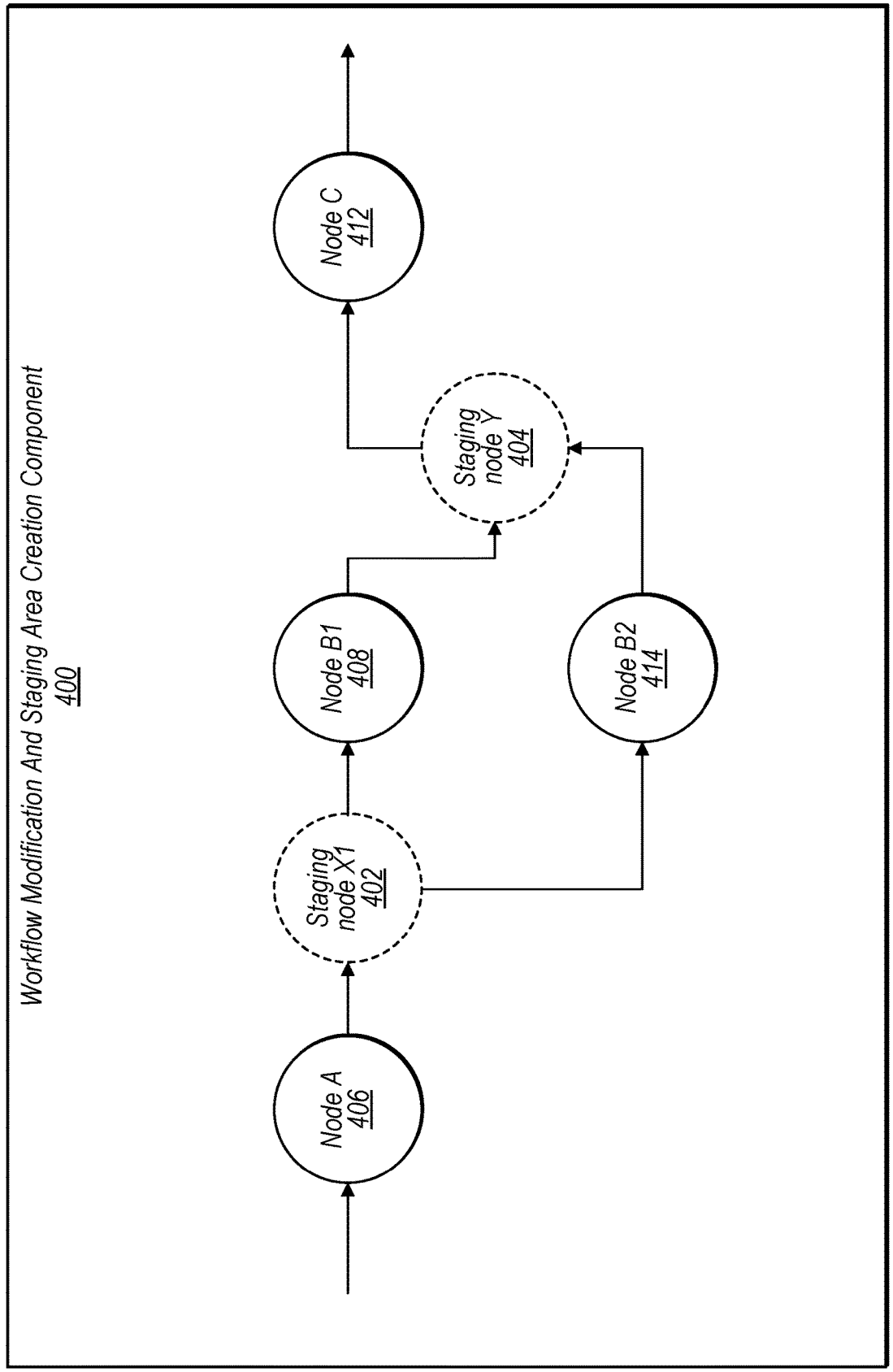
FIG. 4 is another block diagram of another generic workflow graph that illustrates adaptively throttling service calls to service endpoints from workflows by modifying workflow definitions to include staging areas, according to some embodiments.

FIG. 4 is another block diagram of another generic workflow graph that illustrates adaptively throttling service calls to service endpoints from workflows by modifying workflow definitions to include staging areas, according to some embodiments. FIG. 4 shows an optimization of the graph in FIG. 3, where only one staging node X1 (402) is needed before both nodes B1 (408) and B2 (414), because transitions to nodes B1 (408) and B2 (414) only occur from a common node A (406). Since node A (406) is the common predecessor node to both nodes B1 (408) and B2 (414), where nodes B1 and B2 might be indicated as operating below the performance threshold, then only one staging area node X1 (402) is needed to handle transitions out of node A (406) to either nodes B1 (408) or B2 (414).

Like FIG. 3, the one or more workflow definitions in FIG. 4 are defined according to a graph-based structure, where the plurality of tasks are represented as nodes in the graph-based structure, and the dependency ordering between the tasks is specified by edges between the nodes on the graph-based structure. An unmodified version of this graph-based structure might be stored as a workflow definition (122, 124, ...) in the workflow definition repository (120) of FIG. 1. Workflow engine instances (134a ... n, 136a ... n) might be executing workflows according to the workflow definition of this graph-based structure, according to some embodiments.

FIG. 4 discloses a situation where network-based services that correspond to Nodes B1 (408), B2 (414), and C (412) might be indicated as operating below the performance threshold. Thus, the workflow modification and staging area creation component (400) of the workflow manager (100) can modify the graph to incorporate a staging area in the modified graph at locations that, according to the dependency ordering, is prior to the tasks (B1 (408), B2 (414), and C (412)) involving sending a service call to network-based services indicated as operating below the performance threshold. Thus, staging node X1 (402) is inserted before nodes B1 (408) and B2 (414), and staging node Y (404) is inserted before node C (412). The modified graph, therefore, indicates, for the workflow engine instances executing a workflow according to this graph, to transition the workflow to the appropriate staging area (402, 404), instead of the tasks (408, 414, 412) involving sending the service calls to the network-based services indicated as operating below the performance threshold.

Figure 5:
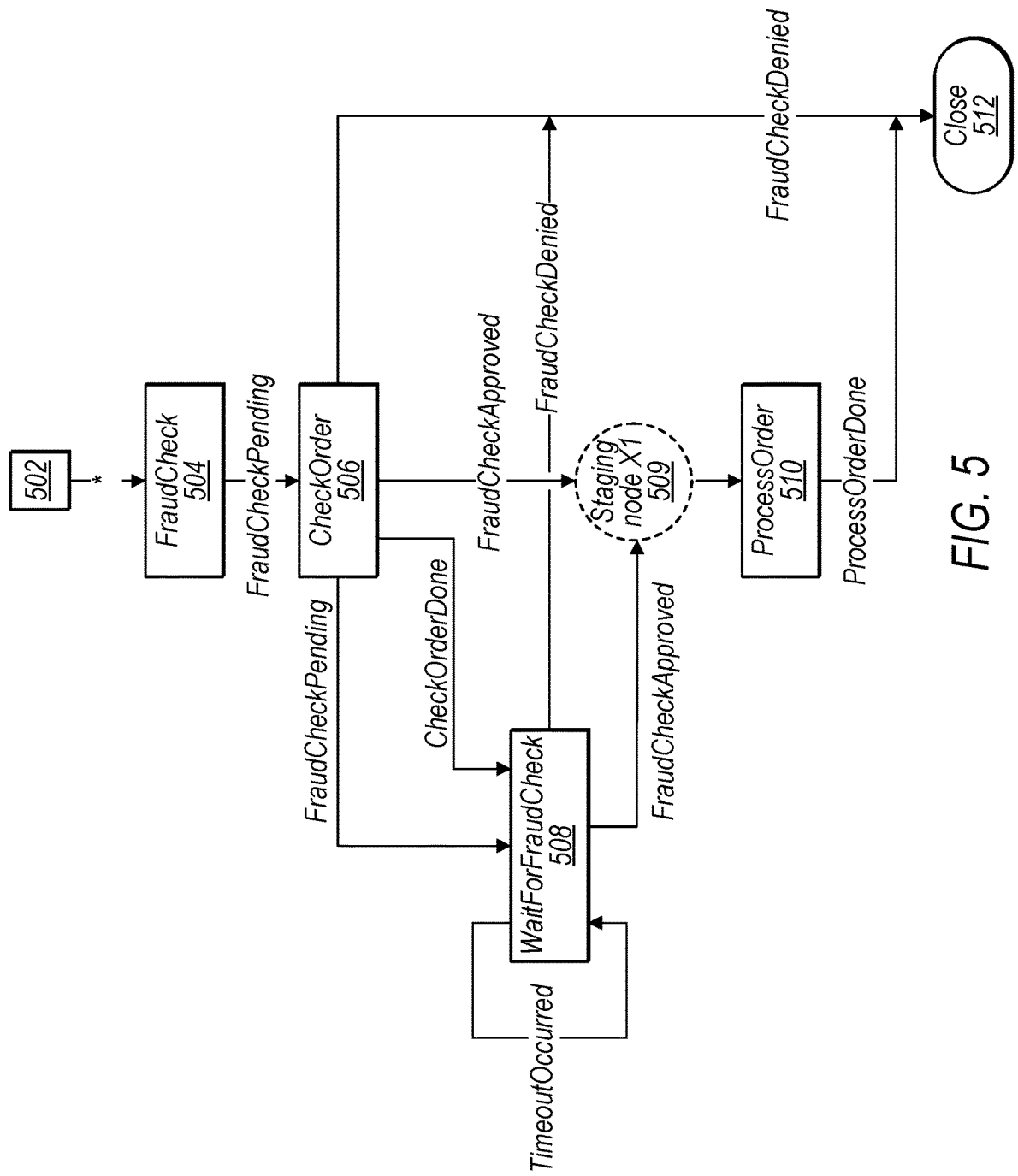
FIG. 5 is a block diagram of a more specific workflow graph for order processing that illustrates adaptively throttling service calls to service endpoints from workflows by modifying workflow definitions to include staging areas, according to some embodiments.

FIG. 5 is a block diagram of a more specific workflow graph for order processing that illustrates adaptively throttling service calls to service endpoints from workflows by modifying workflow definitions to include staging areas, according to some embodiments. FIG. 5 begins at node 502, and includes the nodes: FraudCheck (504), CheckOrder (506), WaitForFraudCheck (508), ProcessOrder (510), and Close (512). An unmodified version of this graph-based structure might be stored as a workflow definition (122, 124, ...) in the workflow definition repository (120) of FIG. 1, depending on the embodiment. Workflow engine instances (134a ... n, 136a ... n) might be executing workflows according to the workflow definition of this graph-based structure, according to some embodiments.

FIG. 5 discloses a situation where network-based services that correspond to ProcessOrder (510) might be indicated as operating below the performance threshold. Thus, the workflow modification and staging area creation component (106) of the workflow manager (100) can modify the graph to incorporate a staging area in the modified graph at locations that, according to the dependency ordering, is prior to the task ProcessOrder (510) that involves sending a service call to a network-based service indicated as operating below the performance threshold. Thus, staging node X1 (509) is inserted before ProcessOrder (510). The modified graph, therefore, indicates, for the workflow engine instances executing a workflow according to this graph, to transition the workflow to the appropriate staging area (509), instead of the ProcessOrder task (510) involving sending the service call to the network-based service indicated as operating below the performance threshold.

Figure 6:
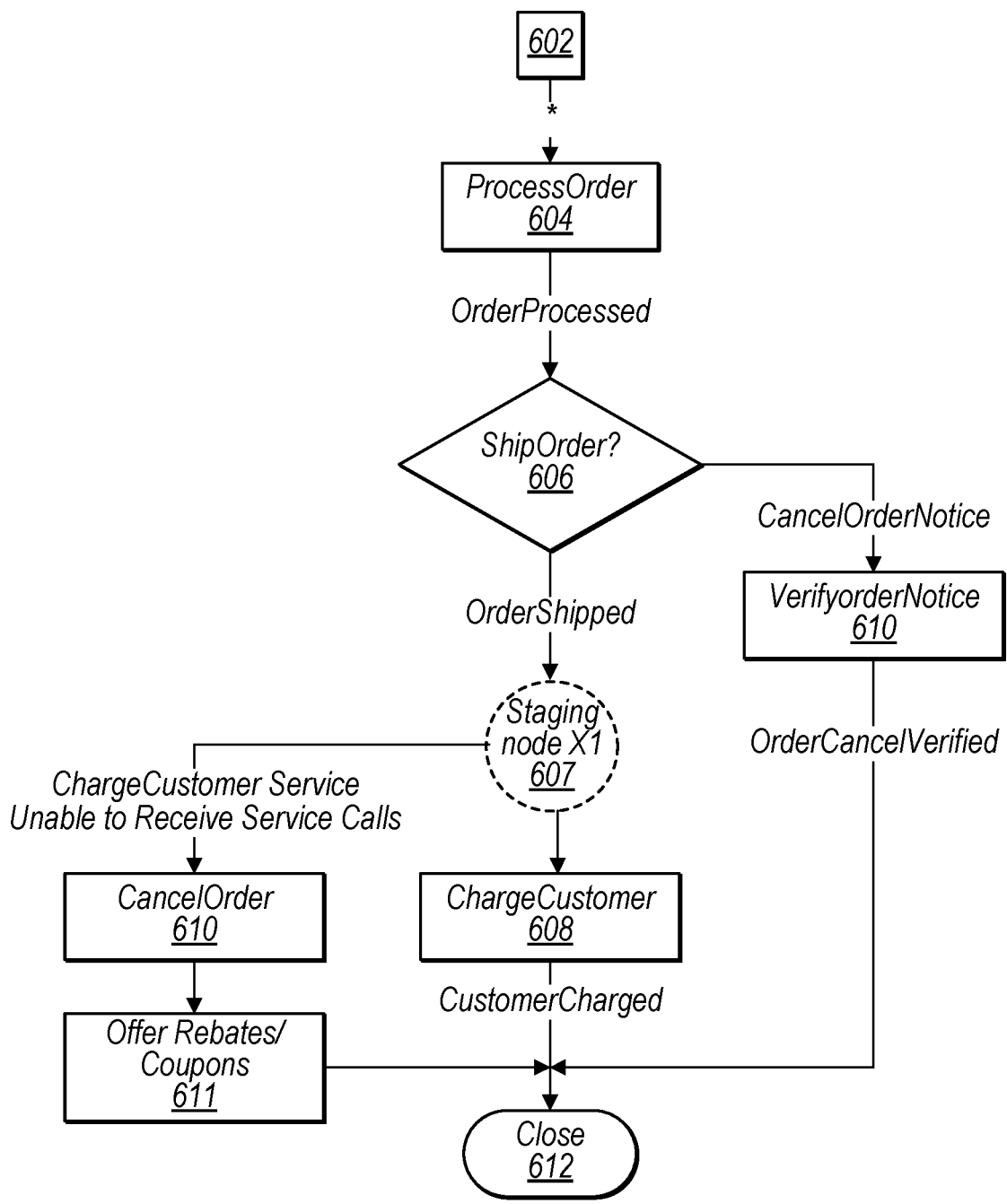
FIG. 6 is another block diagram of another more specific workflow graph for shipping an order and charging a customer that illustrates adaptively throttling service calls to service endpoints from workflows by modifying workflow definitions to include staging areas, according to some embodiments.

FIG. 6 is another block diagram of another more specific workflow graph for shipping an order and charging a customer that illustrates adaptively throttling service calls to service endpoints from workflows by modifying workflow definitions to include staging areas, according to some embodiments. FIG. 6 begins at node 602, and includes the nodes: ProcessOrder (604), ShipOrder? (606) VerifyOrder-Notice (610), ChargeCustomer (608), and Close (612). An unmodified version of this graph-based structure might be stored as a workflow definition (122, 124, . . . ) in the workflow definition repository (120) of FIG. 1, depending on the embodiment. Workflow engine instances (134*a* . . . n, 136*a* . . . n) might be executing workflows according to the workflow definition of this graph-based structure, according to some embodiments.

FIG. 6 discloses a situation where network-based services that correspond to ChargeCustomer (608) might be indicated as operating below the performance threshold. Thus, the workflow modification and staging area creation component (106) of the workflow manager (100) can modify the graph to incorporate a staging area in the modified graph at locations that, according to the dependency ordering, is prior to the task ChargeCustomer (608) that involves sending a service call to a network-based service indicated as operating below the performance threshold. Thus, staging node X1 (607) is inserted before ChargeCustomer (608). The modified graph, therefore, indicates, for the workflow engine instances executing a workflow according to this graph, to transition the workflow to the appropriate staging area (607), instead of the ChargeCustomer task (608) involving sending the service call to the network-based service indicated as operating below the performance threshold.

After the workflow engine instances executing workflows according to this graph transition their workflows to the staging area (607), then those workflows hold in the staging area for a period of time. During this time, the workflow manager can determine if additional performance or health information indicates that the network-based service associated with the ChargeCustomer (608) task has the capacity to process additional service calls, in some embodiments. If the workflow manager determines that the network-based service associated with the ChargeCustomer (608) task has the capacity to process additional service calls, then the workflow manager might direct at least one of the workflow engine instances to transition its workflow from the staging area (607) to the ChargeCustomer (608) task. However, if the workflow manager determines that the network-based service associated with the ChargeCustomer (608) task does not have the capacity to process additional service calls, then the workflow manager might direct at least one of the workflow engine instances to transition its workflow from the staging area (607) to a second task involving a second service call to a second network-based service, different than the network-based service, in some embodiments. This second task can be a CancelOrder (610) task which calls a network-based service that cancels the customer order. This CancelOrder (610) task might itself transition into an Offer Rebates/Coupons (611) task, that calls a network-based service which offers the customer rebates or coupons for having their order cancelled. After this Offer Rebates/Coupons (611) task is completed, then the workflow might transition to the Close (612) state, in some embodiments.

The examples of a network-based service that implements adaptively throttling service calls to service endpoints from workflows by modifying workflow definitions to include staging areas as discussed in FIGS. 2-6 above have been given in regard to a publicly offered service in a provider network (e.g., a virtual compute service). However, various other types of network-based services, which may be privately implemented (e.g., limited to trusted entities), may be implemented and thus may also implement adaptively throttling service calls to service endpoints from workflows by modifying workflow definitions to include staging areas, in other embodiments.

Figure 7:
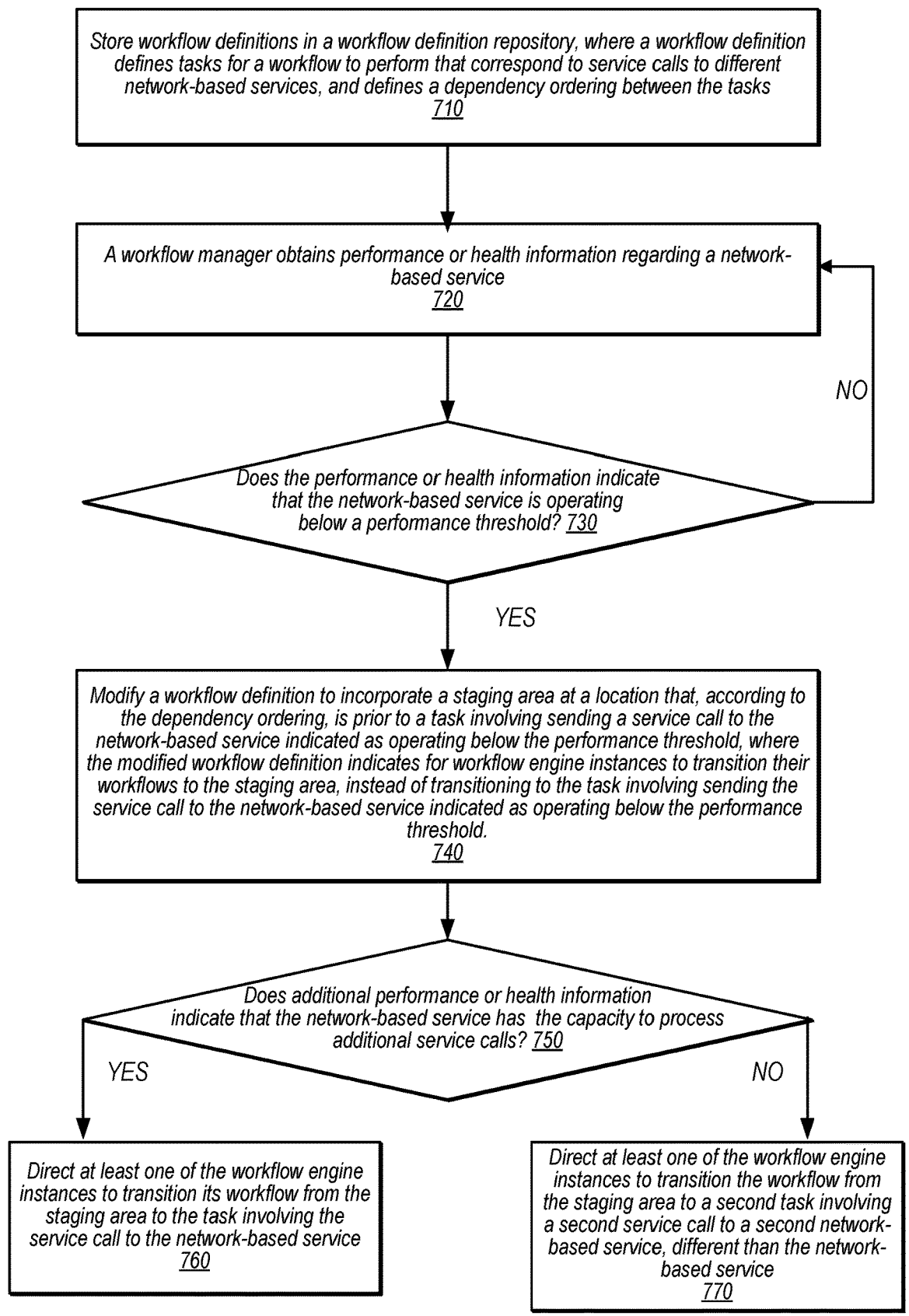
FIG. 7 is a high-level flowchart illustrating various methods and techniques for adaptively throttling service calls to service endpoints from workflows by modifying workflow definitions to include staging areas, according to some embodiments.

Methods for Adaptively Throttling Service Calls to Service Endpoints from Workflows by Modifying Workflow Definitions to Include Staging Areas FIG. 7 is a high-level flowchart illustrating various methods and techniques for adaptively throttling service calls to service endpoints from workflows by modifying workflow definitions to include staging areas, according to some embodiments. The flowchart begins at 710 where an entity stores workflow definitions in a workflow definition repository, where a workflow definition defines tasks for a workflow to perform that correspond to service calls to different network-based services, and defines a dependency ordering between the tasks. Block 710 might be performed by the workflow manager 100, another component of a workflow service, or an entity external to the workflow service such as a user or administrator. After block 710, the flowchart then transitions to block 720 where a workflow manager obtains performance or health information regarding a network-based service.

Then, in block 730, the flowchart determines whether the performance or health information indicates that the network-based service is operating below a performance threshold, e.g., due to overloading, a fault, etc. If the network-based service is not operating below the performance threshold, then the flowchart simply returns to block 720 where it continues to obtain performance or health information regarding a network-based service. If, however, the network-based service is operating below the performance threshold, then the flowchart transitions to block 740. At 740, the method modifies a workflow definition to incorporate a staging area at a location that, according to the dependency ordering, is prior to the task involving sending a service call to the network-based service indicated as operating below the performance threshold. The modified workflow definition indicates, for workflow engine instances that execute workflows using the modified workflow definition, to transition their workflows to the staging area, instead of transitioning to the task involving sending the service call to the network-based service indicated as operating below the performance threshold.

From block 740, the flowchart transitions to block 750 which determines whether additional performance or health information indicates that the network-based service has the capacity to process additional service calls. Before this block 750, the flowchart might obtain the additional performance or health information from the network-based service, similar to block 720. However, this potential obtaining additional performance or health information is not shown in this flowchart. If additional performance or health information does indicate that the network-based service has the capacity to process additional service calls, then the flowchart transitions to block 760. At 760, the method directs at least one of the workflow engine instances to transition its workflow from the staging area to the task involving the service call to the network-based service. This allows that workflow engine instance to make a service call to that network-based service. If, however, additional performance or health information does not indicate that the network-based service has the capacity to process additional service calls, then the flowchart transitions to block 770. At block 770, the method directs at least one of the workflow engine instances to transition the workflow from the staging area to a second task involving a second service call to a second network-based service, different than the network-based service, according to some embodiments. In other embodiments, a workflow manager wouldn't necessarily have to direct any workflow engine instances to transition to a different node and/or task. Instead, in these embodiments, the transition to a different node or task might handled in the definition of the stage area itself, with a timeout mechanism, for example. In some of these embodiments, if the workflow engine instance executing a workflow that has transitioned to the staging area waits for longer than the timeout time, then the workflow engine instance might automatically to transition the workflow from the staging area to the second task involving the second service call to the second network-based service, in some embodiments. In other embodiments the workflow might transition to and ending or stopping state or just might simply terminate.

Figure 8:
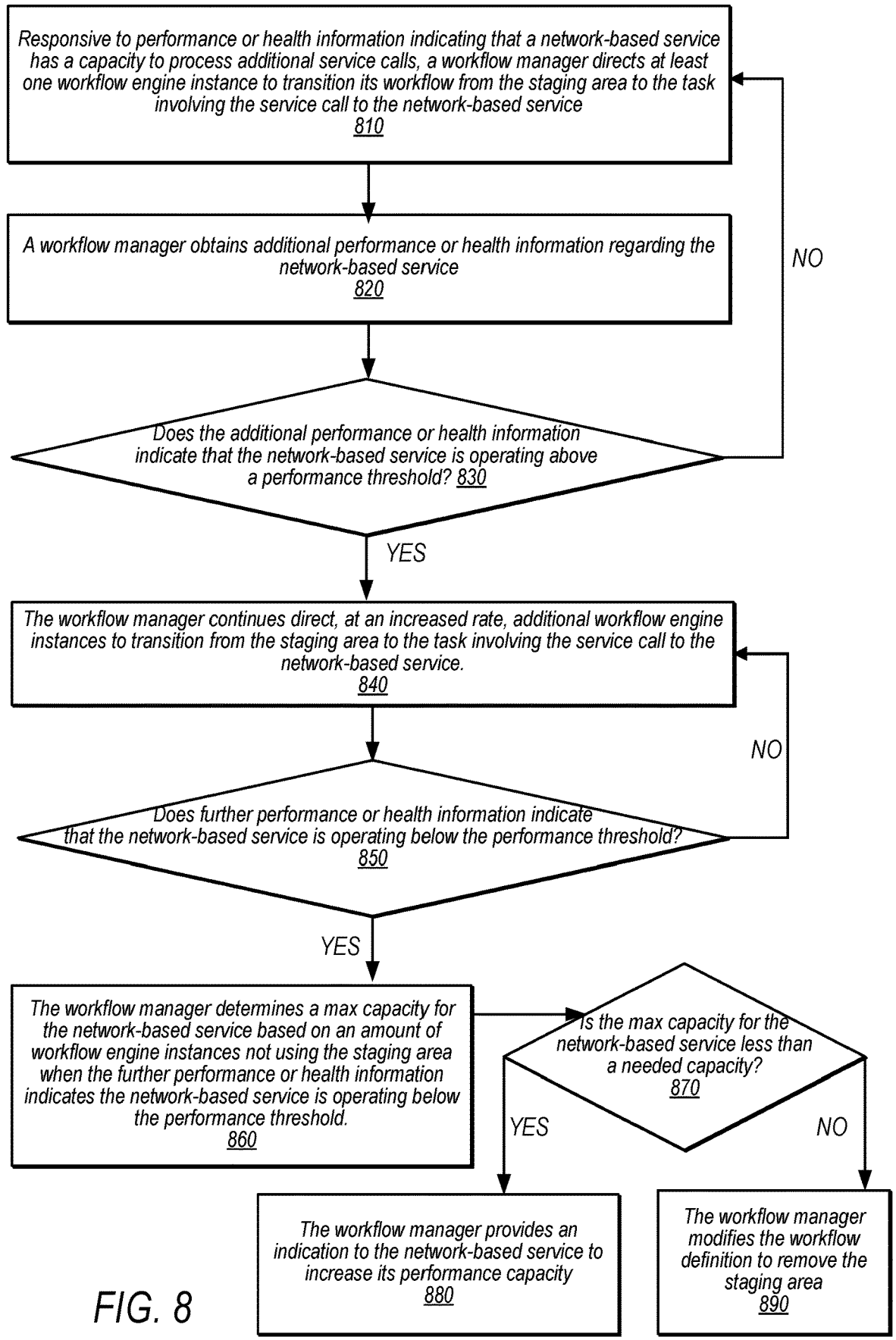
FIG. 8 is a high-level flowchart illustrating various methods and techniques for increasing the traffic to a network-based service that was operating below a performance threshold, and for determining a maximum capacity for the network-based service, according to some embodiments.

FIG. 8 is a high-level flowchart illustrating various methods and techniques for increasing the traffic to a network-based service that was operating below a performance threshold, and for determining a maximum capacity for the network-based service, according to some embodiments. The flowchart begins at block 810 where, responsive to performance or health information indicating that a network-based service has a capacity to process additional service calls, a workflow manager directs at least one workflow engine instance to transition its workflow from the staging area to the task involving the service call to the network-based service. The flowchart then transitions to block 820 where a workflow manager obtains additional performance or health information regarding the network-based service.

The method determines whether the additional performance or health information indicates that the network-based service is operating above a performance threshold at block 830. If the additional performance or health information indicates that the network-based service is not operating above a performance threshold, then the flowchart returns to the beginning at block 810 where a workflow manager directs at least one workflow engine instance to transition its workflow from the staging area to the task involving the service call to the network-based service, responsive to performance or health information indicating that a network-based service has a capacity to process additional service calls. If, however, the additional performance or health information indicates that the network-based service is operating above a performance threshold, then the flowchart continues to block 840 where the workflow manager continues to direct, at an increased rate, additional workflow engine instances to transition from the staging area to the task involving the service call to the network-based service. From block 840, the flowchart then transitions to block 850.

At block 850, the method determines whether further performance or health information indicates that the network-based service is operating below the performance threshold. If further performance or health information does not indicate that the network-based service is operating below the performance threshold, then the flowchart returns to block 840 where it increases the rate. At block 840, the workflow manager continues to direct, at an increased rate, additional workflow engine instances to transition from the staging area to the task involving the service call to the network-based service. If, however, further performance or health information does indicate that the network-based service is operating below the performance threshold, then the flowchart transitions to block 860. At block 860, the workflow manager determines a maximum capacity for the network-based service based on an amount of workflow engine instances not using the staging area, when the further performance or health information indicates the network-based service is operating below the performance threshold. From block 860, the flowchart then transitions to decision block 870.

At block 870, the method determines if the maximum capacity for the network-based service is less than a needed capacity. The workflow service might need, for example, the network-based service to process one-thousand orders per second, but the current maximum capacity of the network-based service is only processing five-hundred orders per second. When the maximum capacity for the network-based service is less than a needed capacity, then the workflow transitions to block 880 where the workflow manager provides an indication to the network-based service to increase its performance capacity. After receiving this indication, the network-based service scales-up by adding more hosts, in some embodiments. When, however, the maximum capacity for the network-based service is more than a needed capacity, and since the network-based service is now operating at its maximum capacity at this point in the flowchart, then the flowchart transitions to block 890 where the workflow manager modifies the workflow definition to remove the staging area. The staging area is not needed anymore, and so can be removed from the workflow definition. Removing a staging area can involve the same actions and communications with other entities (inside and outside of a workflow service) that were performed when adding a staging area, except that the staging area is removed from the workflow definition, instead of being added.

Illustrative Computer System

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the workflow service described herein). The various methods as illustrated in the figures and described herein represent example embodiments of methods. The order of any method may be changed, and various elements may be added, reordered, combined, omitted, modified, etc.

Figure 9:
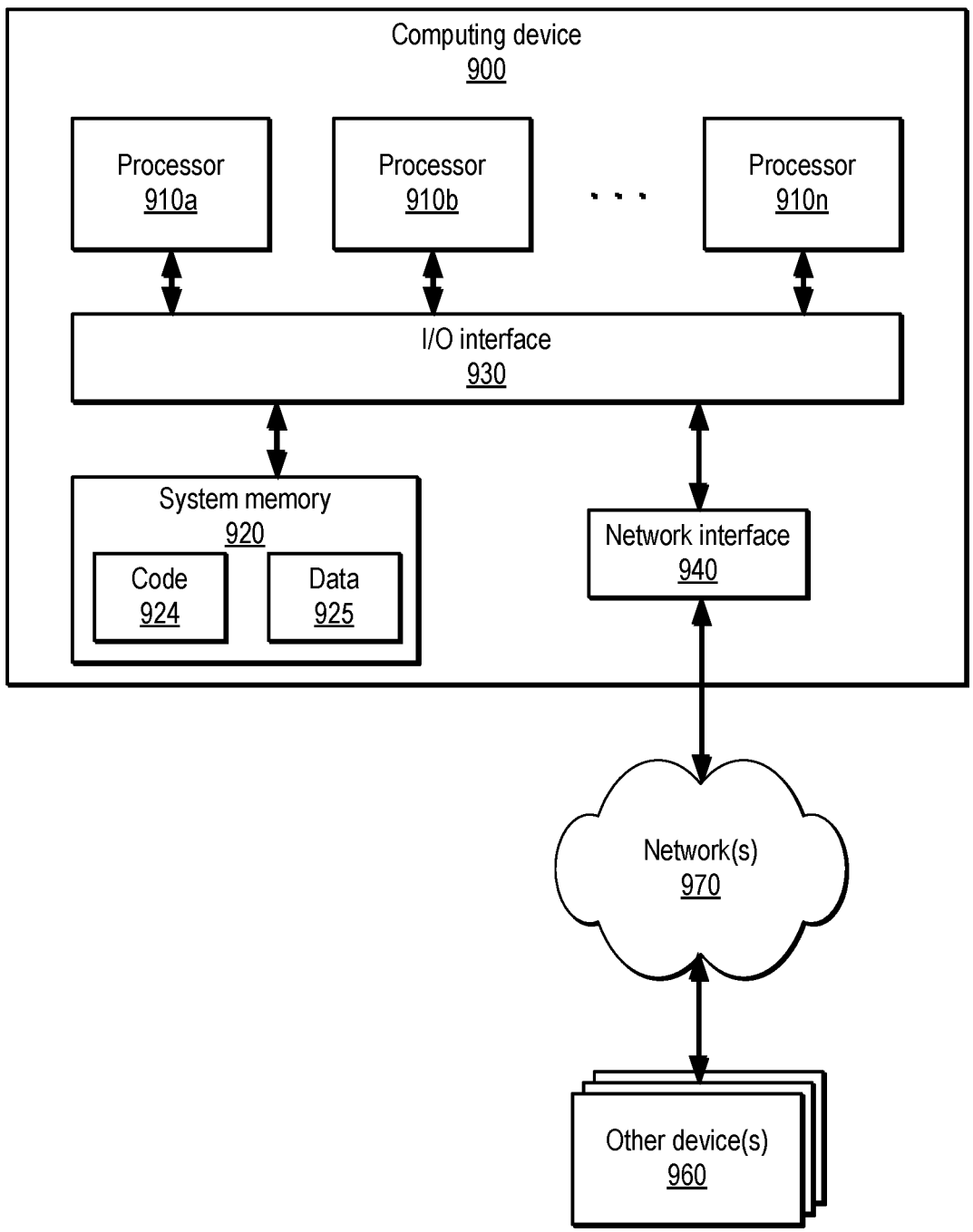
FIG. 9 is a block diagram illustrating an example computing system, according to some embodiments.

Embodiments of adaptively throttling service calls to service endpoints from workflows by modifying workflow definitions to include staging areas, as described herein, may be executed on one or more computer systems, which may interact with various other devices. FIG. 9 is a block diagram illustrating an example computer system, according to various embodiments. For example, computer system 900 may be configured to implement storage and/or compute nodes of a compute cluster, a data stores, and/or a client, in different embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 900 includes one or more processors 910 (any of which may include multiple cores, which may be single or multi-threaded) coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. The computer system 900 also includes one or more network communication devices (e.g., network interface 940) for communicating with other systems and/or components over a communications network (e.g. Internet, LAN, etc.).

In the illustrated embodiment, computer system 900 also includes one or more persistent storage devices 960 and/or one or more I/O devices 980. In various embodiments, persistent storage devices 960 may correspond to disk drives, tape drives, solid state memory, other mass storage devices, block-based storage devices, or any other persistent storage device. Computer system 900 (or a distributed application or operating system operating thereon) may store instructions and/or data in persistent storage devices 960, as desired, and may retrieve the stored instruction and/or data as needed. For example, in some embodiments, computer system 900 may host a storage system server node, and persistent storage 960 may include the SSDs attached to that server node.

Computer system 900 includes one or more system memories 920 that are configured to store instructions and data accessible by processor(s) 910. In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) 910 to implement the methods and techniques described herein. In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement the functionality of a resource host, in different embodiments. In some embodiments, program instructions 925 may implement multiple separate clients, nodes, and/or other components.

In some embodiments, program instructions 925 may include instructions executable to implement an operating system (not shown), which may be any of various operating systems, such as UNIX, LINUX, Solaris™, MacOS™, Windows™, etc. Any or all of program instructions 925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include data store 945, which may be configured as described herein. In general, system memory 920 (e.g., data store 945 within system memory 920), persistent storage 960, and/or remote storage 970 may store data blocks, replicas of data blocks, metadata associated with data blocks and/or their state, configuration information, and/or any other information usable in implementing the methods and techniques described herein.

In one embodiment. I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network, such as other computer systems 990, for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of computing devices, each comprising one or more processors and associated memory, configured to implement a plurality of network-based services;
   a storage device configured to implement a workflow definition repository storing one or more workflow definitions, wherein a respective workflow definition defines a plurality of tasks for a workflow to perform that corresponds to service calls to be made by a plurality of workflow engine instances to different ones of the plurality of network-based services and defines a dependency ordering between the tasks;
   a plurality of workflow execution nodes, each comprising one or more processors and associated memory, and each configured to implement one or more of the plurality of workflow engine instances, wherein respective ones of the workflow engine instances are configured to:
      obtain, from the workflow definition repository, one of the workflow definitions for executing a workflow; and
      execute the workflow, comprising one or more service calls to one or more of the plurality of network-based services according to the one of the workflow definitions; and
   one or more different computing devices, comprising one or more other processors and associated memory, configured to implement a workflow manager, wherein the workflow manager is configured to:
      obtain performance or health information regarding one or more of the plurality of network-based services, wherein the performance or health information includes at least service response times, error rates, and resource utilization metrics;
      responsive to the performance or health information indicating that at least one of the one or more network-based services is operating below a performance threshold:
         determine, based on analysis of dependencies between tasks in the workflow definition and identification of tasks that impact the at least one network-based service, a location for a staging area that, according to the dependency ordering, is prior to a task involving a given one of the plurality of workflow engine instances sending a service call to the at least one network-based service indicated as operating below the performance threshold, and
         implement a gradual traffic ramping process including, modify at least one of the workflow definitions to incorporate a staging area in the modified workflow definition at the determined location, wherein the modified workflow definition indicates for the given workflow engine instance to transition the workflow to the staging area, instead of the task involving sending the service call to the at least one network-based service indicated as operating below the performance threshold;

initiate the transition of the workflow to the staging area with a first subset of the workflows of the at least one workflow definitions;

monitor updated performance or health information of the at least one network-based service indicated as operating below the performance threshold; and gradually increase the number of workflows transitioned to the staging area based on the updated performance or health information of the at least one network-based service indicated as operating below the performance threshold;

responsive to the updated performance or health information indicating that the at least one network-based service has a capacity to process additional service calls, direct at least one of the workflow engine instances to transition the workflow from the staging area to the task involving one or more of the workflow engine instances sending the service call to the at least one network-based service;

determine a maximum service capacity, for the at least one network-based service, based on the updated performance or health information; and responsive to the maximum service capacity for the at least one network-based service being greater than a needed capacity, modify the workflow definition to remove the staging area.

2. The system of claim 1, wherein the one or more workflow definitions are defined according to a graph-based structure, wherein the plurality of tasks are represented as nodes in the graph-based structure, and the dependency ordering between the tasks is specified by edges between the nodes on the graph-based structure.

3. The system of claim 1, wherein the workflow manager is further configured to:
 determine that updated performance or health information indicates that the at least one network-based service is operating above a same or different performance threshold; and
 modify the modified workflow definition to remove the staging area.

4. The system of claim 1, wherein subsequent to directing the at least one workflow engine instance to transition the workflow from the staging area to the task involving the service call to the at least one network-based service, the workflow manager is further configured to:
 obtain additional performance or health information regarding one or more of the plurality of network-based services; and
 responsive to the additional performance or health information indicating that the at least one network-based service is operating above a same or different performance threshold, direct, at an increased rate, at least some of the plurality of workflow engine instances to transition from the staging area to the task involving the service call to the at least one network-based service.

5. The system of claim 1, wherein the workflow manager is further configured to:
 responsive to the performance or health information indicating that the at least one network-based service does not have the capacity to process additional service calls, direct a second workflow engine instance to transition the workflow from the staging area to a second task involving a second service call to a second network-based service, different than the at least one network-based service.

6. A method, comprising:
 obtaining, from a workflow definition repository and by respective ones of a plurality of workflow engine instances implemented by a plurality of workflow execution nodes each comprising one or more processors and associated memory, one or more of a plurality of workflow definitions for executing one or more workflows;
 executing, by respective ones of the plurality of workflow engine instances, workflows, wherein said executing comprises executing a workflow according to one of the plurality of workflow definitions, and wherein a respective workflow definition defines a plurality of tasks for a workflow to perform that corresponds to service calls to be made by the plurality of workflow engine instances to different ones of a plurality of network-based services and defines a dependency ordering between the tasks; and
 performing by a workflow manager of the plurality of workflow execution nodes:
  obtaining performance or health information regarding one or more of the plurality of network-based services, wherein the performance or health information includes at least service response times, error rates, and resource utilization metrics; and
  responsive to the performance or health information indicating that at least one of the one or more network-based services is operating below a performance threshold:
   determining, based on analyzing dependencies between tasks in the workflow definition and identification of tasks that impact the at least one network-based service, a location for a staging area that, according to the dependency ordering, is prior to a task involving a given one of the plurality of workflow engine instances sending a service call to the at least one network-based service indicated as operating below the performance threshold, and
   implementing a gradual traffic ramping process including:
    modifying at least one of the workflow definitions to incorporate a staging area in the modified workflow definition at the determined location, wherein the modified workflow definition indicates for the workflow engine instances to transition the workflow to the staging area, instead of the task involving sending the service call to the at least one network-based service indicated as operating below the performance threshold;
    initiating transition of the workflow to the staging area with a first subset of the workflows of the at least one workflow definitions;
    monitoring updated performance or health information of the at least one network-based service indicated as operating below the performance threshold; and
    gradually increasing the number of workflows transitioned to the staging area based on the updated performance or health information of the at least one network-based service indicated as operating below the performance threshold;

determining a maximum service capacity, for the at least one network-based service, based on the updated performance or health information; and modifying, responsive to the maximum service capacity for the at least one network-based service being greater than a needed capacity, the workflow definition to remove the staging area.

7. The method of claim 6, further comprising:

responsive to the performance or health information indicating that the at least one network-based service has a capacity to process additional service calls, directing, by the workflow manager, at least one of the workflow engine instances to transition the workflow from the staging area to the task involving the service call to the at least one network-based service.

8. The method of claim 7, wherein subsequent to directing the at least one workflow engine instance to transition the workflow from the staging area to the task involving the service call to the at least one network-based service, the method further comprises:

obtaining, by the workflow manager, additional performance or health information regarding one or more of the plurality of network-based services; and responsive to the additional performance or health information indicating that the at least one network-based service is operating above a same or different performance threshold, directing, by the workflow manager and at an increased rate, at least some of the plurality of workflow engine instances to transition from the staging area to the task involving the service call to the at least one network-based service.

9. The method of claim 8, further comprising:

continue directing, by the workflow manager, additional ones of the plurality of workflow engine instances to transition from the staging area to the task involving the service call to the at least one network-based service, until further performance or health information indicates the at least one network-based service is operating below the performance threshold; and determining, by the workflow manager, a max capacity for the at least one network-based service based on an amount of the plurality of workflow engine instances not using the staging area when the further performance or health information indicates the at least one network-based service is operating below the performance threshold.

10. The method of claim 6, wherein the one or more workflow definitions are defined according to a graph-based structure, wherein the plurality of tasks are represented as nodes in the graph-based structure, and the dependency ordering between the tasks is specified by edges between the nodes on the graph-based structure.

11. The method of claim 6, wherein obtaining, by the workflow manager, the performance or health information regarding the one or more of the plurality of network-based services, further comprises at least one or more of:

(a) receiving, by the workflow manager, the performance or health information from the one or more network-based services self-reporting the performance or health information;

(b) querying, by the workflow manager, the one or more network-based services regarding the performance or health information;

(c) obtaining, by the workflow manager, the performance or health information from an external health-related service that determines the performance or health information regarding the one or more network-based services;

(d) obtaining, by the workflow manager, latency information regarding the one or more network-based services from at least some of the plurality of workflow engine instances; or (e) obtaining, by the workflow manager, error or failure information regarding the one or more network-based services from at least some of the plurality of workflow engine instances.

12. The method of claim 6, wherein modifying, by the workflow manager, the at least one workflow definition to incorporate a staging area in the modified workflow definition, further comprises at least one or more of:

(a) modifying, by the workflow manager, the at least one workflow definition in a workflow definition repository that stores the one or more workflow definitions, wherein new workflow engine instances of the plurality of workflow engine instances obtains workflow definitions from the definition repository; or (b) communicating, by the workflow manager, the modified workflow definition to one or more of the workflow execution nodes, wherein the one or more workflow execution nodes correspondingly updates its respective one or more workflow engine instances.

13. The method of claim 6, further comprising:

determining, by the workflow manager, that updated performance or health information indicates that the at least one network-based service is operating above a same or different performance threshold; and modifying, by the workflow manager, the modified workflow definition to remove the staging area.

14. The method of claim 6, further comprising:

responsive to the performance or health information indicating that the at least one network-based service does not have the capacity to process additional service calls, directing, by the workflow manager, a second workflow engine instance to transition the workflow from the staging area to a second task involving a second service call to a second network-based service, different than the at least one network-based service.

15. The method of claim 6, further comprising:

providing, by the workflow manager, an indication to the at least one network-based service to increase the performance capacity of the at least one service.

16. One or more non-transitory, computer-readable storage media, storing program instructions that, when executed on or across one or more computing devices of an workflow manager of a plurality of workflow execution nodes, each workflow execution node implementing one or more of a plurality of workflow engine instances, wherein a respective workflow engine instance is configured to obtain one of the workflow definitions for executing a workflow, and execute the workflow according to the one of the workflow definitions, wherein a respective workflow definition defines a plurality of tasks for a workflow to perform that corresponds to service calls to be made by the plurality of workflow engine instances to different ones of the plurality of network-based services and defines a dependency ordering between the tasks, cause the one or more computing devices to:

obtain, from a workflow definition repository, performance or health information regarding one or more of the plurality of network-based services, wherein the performance or health information includes at least service response times, error rates, and resource utilization metrics; and responsive to the performance or health information indicating that at least one of the one or more network-based services is operating below a performance threshold:
  determine, based on analysis of dependencies between tasks in the workflow definition and identification of tasks that impact the at least one network-based service, a location for a staging area that, according to the dependency ordering, is prior to a task involving a given one of the plurality of workflow engine instances sending a service call to the at least one network-based service indicated as operating below the performance threshold, and
  implement a gradual traffic ramping process including,
    modify at least one of the workflow definitions to incorporate a staging area in the modified workflow definition at the determined location, wherein the modified workflow definition indicates for the workflow engine instances to transition the workflow to the staging area, instead of the task involving sending the service call to the at least one network-based service indicated as operating below the performance threshold;
    initiate transition of the workflow to the staging area with a first subset of the workflows of the at least one workflow definitions;
    monitor updated performance or health information of the at least one network-based service indicated as operating below the performance threshold; and
    gradually increase the number of workflows transitioned to the staging area based on the updated performance or health information of the at least one network-based service indicated as operating below the performance threshold;
  determine a maximum service capacity, for the at least one network-based service, based on the updated performance or health information; and
  modify, responsive to the maximum service capacity for the at least one network-based service being greater than a needed capacity, the workflow definition to remove the staging area.

17. The one or more non-transitory, computer-readable storage media of claim 16, storing further instructions that when executed on or across the one or more computing devices of the workflow manager, further cause the one or more computing devices to:
  responsive to the performance or health information indicating that the at least one network-based service has a capacity to process additional service calls, direct at least one of the workflow engine instances to transition the workflow from the staging area to the task involving the service call to the at least one network-based service.

18. The one or more non-transitory, computer-readable storage media of claim 17, wherein subsequent to directing the at least one workflow engine instance to transition the workflow from the staging area to the task involving the service call to the at least one network-based service, the one or more storage media stores further instructions that when executed on or across the one or more computing devices of the workflow manager, further cause the one or more computing devices to:
  obtain additional performance or health information regarding one or more of the plurality of network-based services; and
  responsive to the additional performance or health information indicating that the at least one network-based service is operating above a same or different performance threshold, direct, at an increased rate, at least some of the plurality of workflow engine instances to transition from the staging area to the task involving the service call to the at least one network-based service.

19. The one or more non-transitory, computer-readable storage media of claim 16, wherein to obtain the performance or health information regarding the one or more of the plurality of network-based services, the computer-readable storage media stores further instructions that when executed on or across the one or more computing devices of the workflow manager, further cause the one or more computing devices to perform one or more of:
  (a) receive the performance or health information from the one or more network-based services self-reporting the performance or health information;
  (b) query the one or more network-based services regarding the performance or health information;
  (c) obtain the performance or health information from an external health-related service that determines the performance or health information regarding the one or more network-based services;
  (d) obtain latency information regarding the one or more network-based services from at least some of the plurality of workflow engine instances; or
  (e) obtain, by the workflow manager, error or failure information regarding the one or more network-based services from at least some of the plurality of workflow engine instances.

20. The one or more non-transitory, computer-readable storage media of claim 16, wherein to modify the at least one workflow definition to incorporate a staging area in the modified workflow definition, the computer-readable storage media stores further instructions that when executed on or across the one or more computing devices of the workflow manager, further cause the one or more computing devices to perform one or more of:
  (a) modify the at least one workflow definition in a workflow definition repository that stores the one or more workflow definitions, wherein new workflow engine instances of the plurality of workflow engine instances obtain workflow definitions from the definition repository; or
  (b) communicate the modified workflow definition to one or more of the workflow execution nodes, wherein the one or more workflow execution nodes correspondingly updates its respective one or more workflow engine instances.

\* \* \* \* \*